United States Patent Office 3,001,958
Patented Sept. 26, 1961

3,001,958
MODIFYING DRYING OIL
Alexander Schwarcman, Buffalo, N.Y., assignor to Spencer Kellogg and Sons, Inc., Buffalo, N.Y.
No Drawing. Filed Feb. 6, 1957, Ser. No. 638,480
6 Claims. (Cl. 260—18)

The present invention relates to improved coating compositions and particularly to improved drying oil compositions made from the naturally occurring vegetable oils which contain hydroxy unsaturated aliphatic acids, as for instance ricinoleic acid.

It has been proposed heretofore to prepare drying oil compositions by modifying castor oil with so-called iso-cyanates containing a plurality of —N—C—O groups.

A particular disadvantage in the modified oil was the relative instability and the tendency to gelation on standing.

It is an object of the present invention to prepare a di-isocyanate modified castor oil which is capable of forming an extremely hard, rapidly forming film possessing great resistance to attack by acids and alkali and which does not gel.

In the broad aspect of the present invention, castor oil is alcoholized with a glycol or similar product and the alcoholized castor oil is then reacted with di-isocyanate and an ethanolamine. By following the procedure of the present invention a modified castor oil is produced which may be used in the manufacture of coating compositions possessing exceptional drying properties to form hard films resistant to acid or alkali. This modified composition, therefore, can be employed in the manufacture of paints, varnishes and enamels by conventional formulation procedures.

The initial step of the invention is first to alcoholize the castor oil with a glycol and, to this end, the castor oil is reacted with a few percent of the glycol to produce a product which is modified by the glycol alcoholization. To this end, from about 1% to 20% of glycol is employed, based on the weight of castor oil.

The glycol may be ethylene glycol, butylene glycol, propylene glycol. In general, those glycols will be employed having 2 to 4 carbon atoms, that is, the lower glycols.

The alcoholysis is performed in conventional manner by mixing the glycol and castor oil and heating in the neighborhood of about 480° F., which alcoholysis reaction may be accelerated by the employment of a catalytic amount of litharge, that is, about 0.01% to 0.1% or more.

The second step of the procedure of the present invention is the reaction of the alcoholized oil with a di-isocyanate. In this step, to the alcoholized oil there is then added a suitable solvent such as xylene and the selected di-isocyanate. This gives rise to an exothermic reaction and the temperature is elevated to about 190° F. After stirring for about 15 minutes, a small amount of diethanol amine is added and the temperature permitted to rise to about 220 F. The batch is continuously stirred to aid the reaction and when the reaction is complete, which should occur in an additional 15 minutes, additional amounts of xylene are added, generally in sufficient amount to bring the batch to about 50% solids. The end product is of a syrupy consistency which will form a film within one hour, which film is highly alkali resistant.

The poly-isocyanate suitable for use in the reaction may be any of the class of poly-isocyanates listed in U.S. Patent 2,282,827 although, by reason of ready availability and price, it is preferred to employ toluene di-isocyanate, that is, 1-methyl, 2-6,benzene di-isocyanate.

The amount of the di-isocyanate employed, based upon the hydroxyl groups, is twice the amount equivalent to the hydroxyl present in the ricinoleic acid radical of the castor oil molecule plus the amount equivalent to the hydroxyl of the glycol used in the alcoholysis step.

The following are specific examples which are given for purposes of illustration and are not to be deemed to be limitative.

*Example 1*

1000 parts 10% alcoholized castor oil
752 parts di-isocyanate added quickly and the temperature rises to about 205° F.
  In about 10 minutes,
200 parts xylene are added.
  10 minutes later,
200 parts more xylene are added.
  10 minutes later,
200 parts more xylene are added.
  10 minutes later,
152 parts more xylene are added.
  At this stage the temperature reaches about 180° F.
    Stirred for 1½ hours when
1000 parts xylene are added.
  Temperature goes down to about 170° F. and stirred until temperature reaches 135° F.
  At this stage,
60 parts methyl diethanolamine are added.

In variation of the above, to 1000 parts of 10% glycolized oil there is added 376 parts of the polyisocyanate and when temperature reaches about 240° F., 752 parts of xylene are added when temperature falls to 200° F., an additional 376 parts of polyisocyanate added and the mix stirred for about 4 hours when the temperature has fallen to about 110° F., this reaction completed by addition of 60 parts methyldiethanolamine.

It will be understood that the amounts of xylene added and the heating time given are merely illustrative and are not limitative of the invention.

*Example 2*

1000 parts 5% glycolized castor oil
200 parts xylene
636 parts di-isocyanate
  Temperature rises to about 190° F.
60 parts methyl diethanolamine is added. Temperature went up to 175° F.
  The rest of the xylene is added as in Example 1.

It is evident that Examples 1 and 2 represent the same idea except in Example 1, 10% propylene glycol was introduced as against 5% in Example 2. Example 2 also yields a perfectly good product but with a very slight tendency to skin.

A third procedure which is of importance is by mixing original castor oil with alcoholized diglycol castor oil. This procedure produces a very satisfactory non-skinning oil even when the mixture represents only 5% glycolized oil. For instance.

*Example 3*

233 parts castor oil
233 parts 10% glycolized castor oil dissolved in
100 parts xylene
290 parts toluene di-isocyanate added
  At this stage, 30 parts methyl diethanolamine is stirred in.
  Xylene added so that the finished product contains 50 parts solids and 50 parts solvent.

In the above examples, the diethanolamine employed is specifically N-methyl diethanolamine, and the amount employed is generally that quantity needed to neutralize the excess of isocyanate added.

The oil produced by the procedure of the present invention dries rapidly to a film which is extremely resistant to acids and alkalies and so may be used as a vehicle for producing protective films where this characteristic is desired. The film furthermore is hard throughout and possesses a smooth and glossy feel without extreme brittleness.

In the examples above, the amount of polyisocyanate employed is substantially equivalent to the sum of the amount equivalent to the hydroxyl introduced into the mixture by the glycol plus twice the amount equivalent to the hydroxyl derived from the castor oil fatty acid.

A vehicle is produced with best film-forming and non-gelling characteristics, when this equivalency is substantially adhered to, but it will be understood that some variation from this exact equivalency may be made but with some sacrifice of the important characteristic of the invention, i.e., resistant to gelling.

What is claimed is:

1. The process of manufacturing a drying oil from castor oil which comprises first heating the castor oil at an elevated alcoholizing temperature with from 1% to 20% by weight of a glycol having 2 to 4 carbon atoms until ester interchange is substantially complete and then reacting such alcoholized oil by contact in the environment of the so alcoholized oil and in the presence of an inert organic solvent with an amount of an organic di-isocyanate stoichiometrically equivalent to the hydroxyl groups of the glycol added for alcoholysis plus twice the amount of organic di-isocyanate stoichiometrically equivalent to the hydroxyl groups of the initial castor oil so alcoholized and after said reaction has proceeded and before formation of film from said so treated oil adding to the reaction mixture about 6% by weight based on the weight of castor oil and glycol of an N-substituted diethanolamine.

2. Process of claim 1 in which the glycol is propylene glycol.

3. Process of claim 1 in which the di-isocyanate is toluene di-isocyanate.

4. Process of claim 1 in which the N-substituted diethanolamine is N-methyl diethanolamine.

5. Process of claim 1 in which the glycol is propylene glycol, the di-isocyanate is toluene di-isocyanate and the ethanolamine is N-methyl diethanolamine.

6. The process of modifying castor oil which modified oil will form a film upon addition thereto of about 6% of a tertiary amine which comprises first heating the castor oil at an elevated alcoholizing temperature with from 1% to 20% by weight of a glycol having 2 to 4 carbon atoms until ester interchange is substantially complete and then reacting such alcoholizing oil by contact in the environment of the so alcoholized oil and in the presence of an inert organic solvent with an amount of an organic di-isocyanate stoichiometrically equivalent to the hydroxyl groups of the glycol added for alcholysis plus twice the amount of organic di-isocyanate stoichiometrically equivalent to the hydroxyl groups of the initial castor oil so alcoholized.

References Cited in the file of this patent

UNITED STATES PATENTS

| | | |
|---|---|---|
| 2,645,623 | Hermann | July 14, 1953 |
| 2,787,601 | Detrick et al. | Apr. 2, 1957 |
| 2,833,730 | Barthel | May 6, 1958 |
| 2,867,278 | Mallory | Jan. 6, 1959 |

OTHER REFERENCES

Chemical Engineering, April 1950, pp. 165–6.

Heiss et al.: Ind. Eng. Chem. 46, #7, 1498–1503 (1954).